(12) United States Patent
Klement et al.

(10) Patent No.: US 10,318,831 B2
(45) Date of Patent: Jun. 11, 2019

(54) METHOD AND SYSTEM FOR MONITORING THE STATUS OF THE DRIVER OF A VEHICLE

(71) Applicant: gestigon GmbH, Lubeck (DE)

(72) Inventors: Sascha Klement, Lubeck (DE); Sebastian Low, Lubeck (DE); Dennis Munster, Lubeck (DE)

(73) Assignee: GESTIGON GMBH, Lubeck (DE)

( * ) Notice: Subject to any disclaimer, the term of this patent is extended or adjusted under 35 U.S.C. 154(b) by 161 days.

(21) Appl. No.: 15/216,177

(22) Filed: Jul. 21, 2016

(65) Prior Publication Data
US 2018/0025240 A1    Jan. 25, 2018

(51) Int. Cl.
| G06F 17/30 | (2006.01) |
| G06F 3/01 | (2006.01) |
| G06K 9/00 | (2006.01) |
| G06K 9/46 | (2006.01) |
| G06T 7/00 | (2017.01) |
| G06F 16/51 | (2019.01) |
| G06F 16/583 | (2019.01) |
| G06T 7/70 | (2017.01) |
| H04N 13/239 | (2018.01) |

(52) U.S. Cl.
CPC ......... *G06K 9/00845* (2013.01); *G06F 3/012* (2013.01); *G06F 16/51* (2019.01); *G06F 16/5838* (2019.01); *G06K 9/00228* (2013.01); *G06K 9/4604* (2013.01); *G06T 7/70* (2017.01); *H04N 13/239* (2018.05); *G06T 2207/10012* (2013.01)

(58) Field of Classification Search
CPC .................. G06K 9/00845; G06T 2207/10012
USPC .............................................................. 348/47
See application file for complete search history.

(56) References Cited

U.S. PATENT DOCUMENTS

| 5,691,693 A | * | 11/1997 | Kithil | B60N 2/002 180/272 |
| 5,930,392 A | * | 7/1999 | Ho | G06K 9/6282 382/224 |
| 6,049,747 A | * | 4/2000 | Nakajima | B60N 2/002 340/576 |

(Continued)

FOREIGN PATENT DOCUMENTS

WO    WO 2004/111687 A2    12/2004

*Primary Examiner* — Christopher S Kelley
*Assistant Examiner* — Asmamaw G Tarko
(74) *Attorney, Agent, or Firm* — Wood, Phillips, Katz, Clark & Mortimer

(57) ABSTRACT

A system and method are disclosed relating to a computer system that estimates the status of the driver of a vehicle. The system comprises the following steps: Acquisition of an image from a depth sensor containing depth and optional an IR intensity image and an RGB color image; identification of pixels that belong to the drivers head; creation of a 3D model of the head including an intensity model and a variability estimate for depth, grayscale and color information; estimation of the principal head pose and the neutral facial expression; estimation of the current relative head pose with respect to the principal head pose; identification of pixels that do not match the neutral face model with respect to depth, grayscale or color information or any combination thereof; clustering of the pixels with identified deviations; classification of spatial and temporal patterns to identify driver status and distraction events.

14 Claims, 15 Drawing Sheets

(56) References Cited

U.S. PATENT DOCUMENTS

| | | | | |
|---|---|---|---|---|
| 7,620,202 | B2* | 11/2009 | Fujimura | G06K 9/00201 |
| | | | | 348/169 |
| 8,848,975 | B2* | 9/2014 | Tell | G06K 9/00208 |
| | | | | 382/103 |
| 9,251,590 | B2* | 2/2016 | Sharp | G06T 7/0075 |
| 2005/0031166 | A1* | 2/2005 | Fujimura | G06K 9/00369 |
| | | | | 382/103 |
| 2010/0002075 | A1* | 1/2010 | Jung | B60K 28/06 |
| | | | | 348/78 |
| 2013/0030811 | A1* | 1/2013 | Olleon | B60K 35/00 |
| | | | | 704/267 |
| 2013/0038732 | A1* | 2/2013 | Waite | B60R 1/00 |
| | | | | 348/148 |
| 2016/0001781 | A1* | 1/2016 | Fung | G06F 19/345 |
| | | | | 701/36 |
| 2017/0161576 | A1* | 6/2017 | Banno | G06K 9/00845 |

* cited by examiner

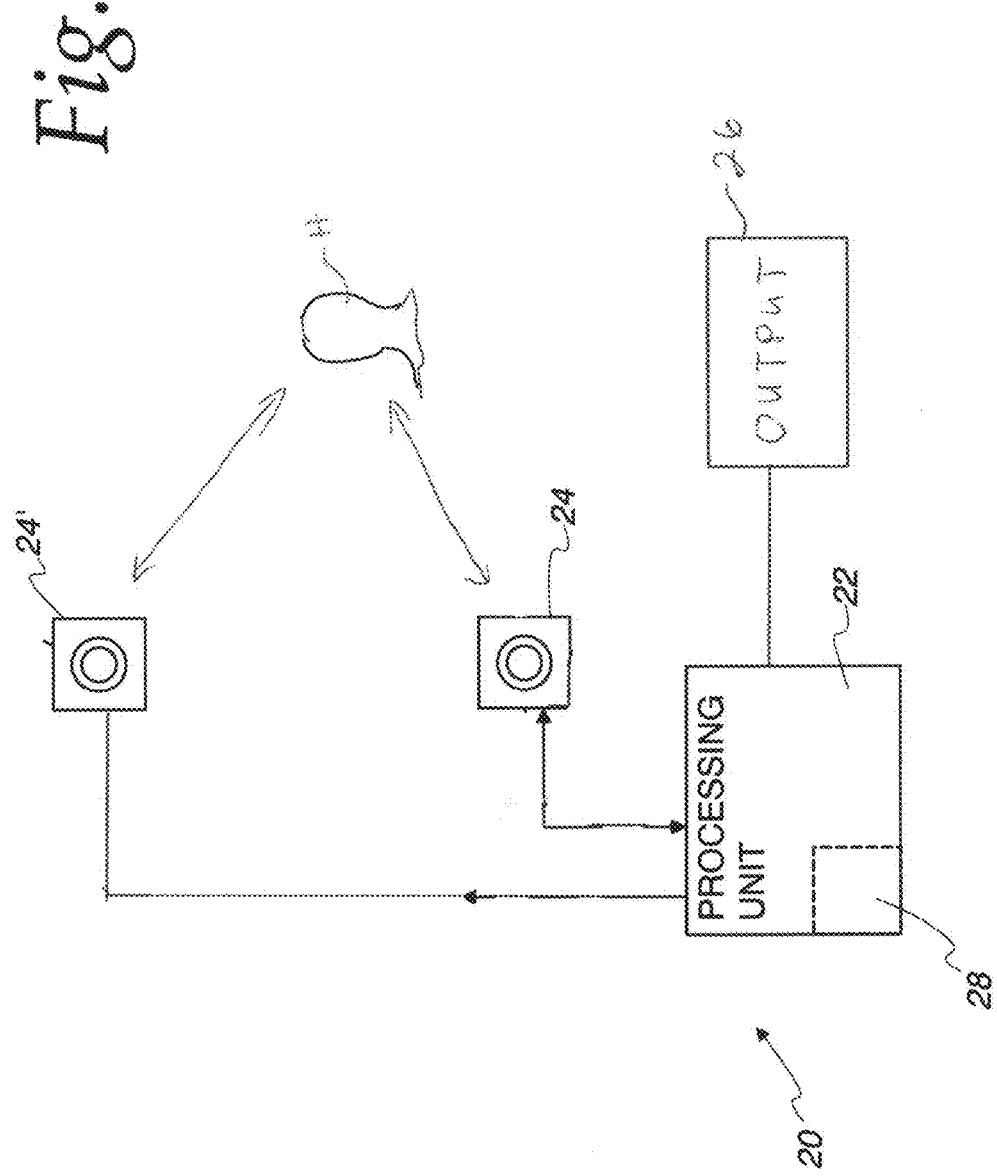

METHOD AND SYSTEM FOR MONITORING THE STATUS OF THE DRIVER OF A VEHICLE

CROSS-REFERENCE TO RELATED APPLICATIONS

Not Applicable.

FIELD OF THE INVENTION

This application relates to the identification of driver states and driver head pose by using 3D sensors.

BACKGROUND OF THE INVENTION

According to the NHTSA, 10% of all fatal crashes in the United States are due to driver distractions with 3179 people killed and an estimated 431,000 people injured in 2014 (according to NHTSA's National Center for Statistics and Analysis as published in the technical report Traffic safety facts: Distracted driving 2014). Thus, monitoring the distraction level of the driver will become a critical success factor of next generation vehicles. Head pose, facial expression and eye-lid movements all may contribute to an overall assessment of the driver's distraction level.

The European New Car Assessment Programme 2020 roadmap Technical report of March 2015 includes a schedule for the promotion of virtual co-pilot concepts and innovations in the field of driver state monitoring. Vehicle manufacturers will be given credit if they provide such safety technologies not just as an add-on feature, but as a standard.

With self-driving cars, the driver must take over control in critical or complex situations. The take-over decision, however, also depends on the state of the driver and thus self-driving cars must rely on driver-status monitoring.

The social obligation to reduce fatal injuries in vehicle crashes has pushed car manufacturers and their suppliers to build sensor systems that not only observe the outside world of a vehicle but also monitor the interior of the vehicle especially the state of the driver of the machinery.

Common systems for driver state monitoring based on visual sensors require the sensors to be mounted in particular locations—for example on the steering wheel as in the US Published application 20100002075 A1—imposing tough constraints on the design process of such systems.

Alternative systems for driver state monitoring are based on very different features and input sources, such as the driver's steering behavior, as disclosed, for example, in U.S. Pat. No. 5,815,070 (Driving state-monitoring apparatus for automotive vehicles); or his ability to respond to an interrogation signal as in U.S. Pat. No. 6,154,123 (Driver alertness monitoring system). The system disclosed in U.S. Pat. No. 6,049,747 (Driver monitoring device) is focused on a particular way of obtaining 3D data by projecting a pattern of bright spots on the drivers face. Further systems, such as in U.S. Pat. No. 7,138,922, assume the existence of a drowsy-driver detector and focus on how to communicate with the drowsy driver by involving a human operator.

Driver state monitoring often relates to face detection. Methods for detecting faces in two-dimensional images are described in a number of scientific publications, of which the most frequently cited one is the standard method developed by Paul Viola and Michael J. Jones (Robust real-time face detection. *International Journal of Computer Vision*, 57(2): 137-154, 2004). Further methods are, for example, disclosed in WO Patent App. PCT/EP2007/006540 by Steinberg et al. and in U.S. patent application Ser. No. 14/563,972 by Corcoran et al.

Most methods for face detection and head tracking rely on facial features or landmarks. The general workflow is to maintain an internal object model including the landmark positions. For every new image, landmarks of the internal model are matched with the current view from the sensor to obtain the relative position between object and sensor. Such methods may fail when landmarks become invisible (e.g. when the user turns away from the sensor) or temporarily occluded (e.g. when the user scratches his or her nose). In some cases, such landmarks cannot be detected at all, e.g. for certain types of glasses, hair and beard styles. Further, variations in illumination, reflections of light from glasses, sunglasses and contact lenses may hinder the detection of valid landmarks.

Generally, landmark-based methods rely on front facing sensors, i.e. the sensor is mounted in a way such that the operator's face points directly towards the sensor in the default position. However, in the most prominent application of monitoring the behavior of a driver of a vehicle, the sensor position will most likely be mounted in non-facing locations such as the A-beam, the rear mirror location, or the center console.

In WO Patent App. PCT/AU2008/000,290, Tell disclosed a typical workflow for a landmark-based method where a three-dimensional object is rendered, salient point features or landmarks are extracted from the three-dimensional object model, corresponding features are localized in an image and the new object orientation is derived from the correspondences between the landmarks of the object model and the view. However, the method focuses on point features defined to be at a predefined number of locations and having highest edginess. Occlusion of some of the predefined locations might hinder the application and resolution of the image sequence is critical for achieving the required performance level.

Head pose estimation is most commonly interpreted as the ability to infer the orientation of the head relative to the view of a camera. Before the development of affordable 3D sensors, early head tracking techniques where limited to using grayscale- or color-image sequences. A good overview of these methods is given in a publication by Erik Murphy-Chutorian and Mohan Manubhai Trivedi (Head pose estimation in computer vision: A survey. *IEEE Transactions on Pattern Analysis and Machine Intelligence*, 31(4):607-626, 2009).

In U.S. patent application Ser. No. 11/420,864, Victor et al. disclose a method for drowsiness detection, which is based on the assumption that drowsiness leads to a relaxation of muscles, which in turn leads to specific head movements that can be identified by head pose detection.

Metrics for measuring the attention level have been disclosed by Langdale-Smith et al. in WO Patent App. PCT/AU2009/001,547; and may include the orientation of faces and eyes, the duration of looking at a particular region of interest, duration of facing a region of interest, facial reaction, and relative changes in facial expression. However, the invention does not disclose a technically feasible way to retrieve and quantify the required features, e.g. the facial expressions.

In WO Patent App. PCT/AU2010/000,142, Langdale-Smith et al. disclose a method for monitoring the attentiveness of an operator of machinery with respect to the motion of the vehicle. They take into account only the three-dimensional position of the operator's head and do not consider facial expressions.

Most methods that operate with faces require a sensor, which is assumed to observe the bare face. In general, however, a driver or machine operator may wear eyeglasses, helmets or other protective equipment that partially occludes facial landmarks. Thus, even methods that enhance facial features before classification by using local image operators such as disclosed by Loy et al. in U.S. patent application Ser. No. 10/951,081, will most likely fail. Additionally, such methods require the visual appearance of the landmarks to be known in advance. The protective equipment of a machine operator will most likely provide good features for visual tracking but the appearance will not be known in advance and may vary largely between operators.

Besides only detecting faces, some methods further process the faces to derive, for example, gaze direction from head or eye positions (U.S. patent application Ser. No. 10/350,835 and U.S. Pat. No. 7,043,056) or facial expression form eyes and lips (U.S. patent application Ser. No. 14/680,977). Some driver monitoring systems focusing exclusively on eye tracking and drowsiness detection have been proposed. In U.S. patent application Ser. No. 14/484,875, Seok et al. disclose a combined gaze tracking and finger detection method to control head up displays in a vehicle.

Other methods such as in U.S. Pat. No. 5,229,754 adapt displays such as head-up displays according to the head pose.

A common alternative to eye-tracking is the monitoring of the head pose of the driver as an approximation to where the driver is looking at. Such methods have been proposed in U.S. Pat. No. 5,691,693, WO Patent App. PCT/US2001/047,612, U.S. patent application Ser. No. 11/317,431, and U.S. patent application Ser. No. 11/796,807, but are not sufficiently accurate.

One of the first methods for reconstructing a rigid object using a low cost consumer depth sensor, called Kinect Fusion, was proposed by Shahram Izadi, et al (Kinectfusion: Real-time 3d reconstruction and interaction using a moving depth camera. In *Proceedings of the 24th Annual ACM Symposium on User Interface Software and Technology*, pages 559-568, 2011). In U.S. Pat. No. 9,251,590, U.S. patent application Ser. No. 13/017,474, and U.S. patent application Ser. No. 13/017,587; data from a Microsoft Kinect RGBD sensor were used to reconstruct surfaces and estimate the current camera position relative to that surface. First, these methods iteratively track the camera position by aligning the current image with an integrated image (obtained by integrating a series of previous images) by using an ICP-based method (Iterative Closest Point). Then, the volume is integrated and views of the reconstructed surface are estimated by ray casting. Here, deviations from the model are regarded as noise whereas in our method they are treated as information that can be used to distinguish object states.

Some extensions allow to estimate the object surface even when the object is deformed while being scanned (Richard A. Newcombe, Dieter Fox, and Steven M. Seitz. Dynamic fusion: Reconstruction and tracking of non-rigid scenes in real-time; and Mingsong Dou, Jonathan Taylor, Henry Fuchs, Andrew Fitzgibbon, Shahram Izadi. 3D scanning deformable objects with a single rgbd sensor; both published in *The IEEE Conference on Computer Vision and Pattern Recognition*, 2015). Therefore, a deformation function is continuously updated during the scanning process. However, the goal here is to compensate for the deformations and not to extract additional useful information that is further processed.

This application describes improvements in systems and methods for identifying driver states and driver head pose.

SUMMARY OF THE INVENTION

As described herein, a system and method utilize depth data to identify the state of a driver and a driver's head pose.

In one aspect of the invention a method is provided for real-time driver state monitoring. The method comprises operating an image processing system to receive a sequence of depth images from a depth sensor. Each depth image comprises image data representing an image of a scene. The image data comprises a depth value indicating distance from the depth sensor. The image processing system identifies a human head in a scene using the sequence of images. The image processing system uses the depth images to track position and orientation of the human head with respect to a principal position and orientation with the human head as modeled as a 3D surface to define a head model and continuously adapt over time to obtain an average neutral face model. The image processing system identifies depth deviations from the neutral face and classifies such depth deviations as different driver states.

It is a feature that supplementary images comprising grey-scale or color images are obtained from the depth sensor or an additional sensor that has been pixel-wise registered to the depth image.

It is another feature that all but head pixels are excluded according to a CAD model of an interior of the car.

It is still another feature that the human head is identified by applying a random decision forest, or by skin color, or by a face detection method.

It is yet another feature that the head model is obtained by an iterative closest point match.

It is still a further feature that the neutral face is stored in a database including history of changes. Depth variations may be compared to the history of changes that have been stored, for a specific driver, in the database, and the comparison is used to extract features for driver-state detection.

There is disclosed in accordance with another aspect a system for real-time driver state monitoring. The system comprises a depth sensor to capture depth images of a scene and generate image data representing the image of the scene. The image data comprises a depth value indicating distance from the sensor. An image processing system is operatively coupled to the sensor to receive a sequence of depth images from the sensor. The image processing system is programmed to identify a human head in the scene using a sequence of images, using the depth images to track position and orientation of the human head with respect to a principal position and orientation where the human head is modeled as a 3D surface to define a head model and continuously adapted over time to obtain an average neutral face model, identifying depth deviations from the neutral face, and classifying such depth deviations as different driver states.

Further features and advantages will be readily apparent from the specification and from the drawings.

BRIEF DESCRIPTION OF THE DRAWINGS

FIG. 1A is a block diagram illustrating a system for monitoring the status of the driver of a vehicle, as described herein;

DETAILED DESCRIPTION

The disclosed method and system relate to identifying the state of a driver of a vehicle comprising features that allow estimating distraction and fatiguing levels.

Although this invention relates to the state of the driver of a vehicle, it will be clear to the skilled person that the very same methods can be applied to monitor the state of an operator of any moving or stationary machinery where fatigue, distraction, inattentiveness or stress may cause dramatic malfunction of the system or cause injuries of any sort. Such machineries comprise but are not limited to aircraft, vessels, construction machines, cranes and production facilities.

In yet another embodiment, the invention may support surveillance tasks such as monitoring patients.

The abstract state of a driver defined by terms such as the levels of attentiveness, fatigue, distraction, and arousal may be derived from physical manifestations such as head pose, eye lid movements, facial expressions and their spatial and temporal evolution. However, every single aspect may not be sufficient for a valid classification of the driver's state to potentially ignore actions and let an automatic driving system take over control. Therefore, this invention aims to provide a holistic approach to driver monitoring where a multitude of features may be provided by a single system.

Figure 1B:
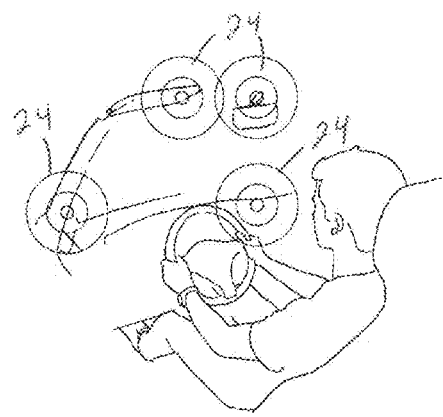
FIG. 1B is an illustration of positioning of sensors in a vehicle relative to position of the driver.

In an illustrative embodiment, as shown in FIG. 1A, an image processing system 20 is used for identifying state and head pose of a driver. The system 20 includes a processing unit 22 and a sensor 24 connected to the processing unit 22. The sensor 24 comprises a three-dimensional (3D) sensor. The sensor 24 can be mounted in any desired orientation or position in a vehicle such as shown in FIG. 1B. The sensor 24 can be mounted with much more flexibility because head tracking does not rely on particular facial features. The sensor 24 can be an off-the-shelf sensor or a special purpose sensor. Moreover, the processing unit 22 may be connected to multiple sensors, such as the sensor 24 and a second sensor 24', as well as additional sensors, not shown. The image processing system 20 also includes an output block 26 from the processing unit 22. The output block 26 is used for outputting information such as the identified driver state and driver head pose. This output can be used by other programs or devices within the vehicle, or by remote units, as necessary or desired. This application is not directed to how such data is used, but rather the determination of such data.

The processing unit 22 comprises a programmed processor, such as a personal computer, server, or the like, operating in accordance with a custom program stored in memory 28, as described below. The program is generally illustrated in the flow diagram of FIG. 2, discussed below. The memory 28 may be internal memory and/or external memory, such as RAM, ROM, hard drives, optical drives, servers, or related to further processors. The system 20 shown herein is not intended to be limited to any particular hardware configuration, as the methodology implemented by the system 20 may be implemented on numerous different hardware configurations.

In an illustrative example, a human head H is positioned proximate the sensor 24. The sensor 24 is operable to capture image data in a scene. The scene is defined by the surroundings in view of the sensor 24, such as shown in FIG. 1B.

As described herein, a method for monitoring the driver comprises operating the image processing system 20, using the processing unit 22, to receive image data from the sensor 24. The image data represents an image of a scene with the drivers head H as an object. The image data comprises a two-dimensional array of pixels and each pixel contains a depth value indicating distance from the sensor 24. The image processing system identifies the human head H in the scene using a sequence of images. The system 20 uses the depth images to track position and orientation of the head H with respect to a principal position and orientation where the head H is modeled as a 3D surface to define a head model and is continuously adapted over time to contain a neutral face model. The system 20 identifies depth deviations from the neutral face and classifies such depth deviations as different driver states.

The method uses data provided by the depth sensor 24. This may also be referred to as a 3D sensor as a 3D camera, or range sensor. The data provided by the 3D sensor is called range data or depth data. The sensor has pixels that lie in the image plane and are there indexed with indices (i,j). For each pixel (i,j) the sensor provides a range value (distance to the object) that represents the distance from the pixel to the imaged 3D point in the 3D space in front of the sensor. In a coordinate frame with (x,y) axes lying in the image plane (centered at the intersection of the image plane with the optical axes), the 3D point that has been sensed has coordinates (X,Y,Z) and can be represented as a vector. Different types of 3D sensors exist. They are based on different methods that can be used to acquire range data. The first distinction is between direct methods and indirect methods.

The most important direct method is to measure the time light needs to travel from the light source to the object and back to the sensor; these sensors are called time-of-flight-sensors or ToF sensors. The time can be measured either by sending a pulse of light or by modulating the light source and measuring the phase shift between emitted and reflected light.

Most indirect methods are based on triangulation, meaning that a 3D point on the object is illuminated and/or imaged from different known viewpoints, which, together with the 3D point, define a triangle from which the distance to the 3D point can be determined. This method is used in different kinds of sensors; the first Microsoft Kinect sensor, for example, uses an infrared-light projector and a camera at different positions. The classical approach is to use two or more cameras, with the benefit that no additional light source is required, although in some cases additional light sources are used.

The different sensors differ in the precision by which they can measure range but they also differ in terms of how many 3D data points they can provide. A ToF sensor can measure range as long as the object reflects sufficient light, whereas a standard stereo system requires that the object has some structure that can be matched in the two (or more) images.

The herein disclosed method may utilize any 3D sensor, as long as it provides a sufficiently dense cloud of 3D points and a number of supplementary images that are aligned with the depth image. Such supplementary images may either be grayscale images such as the amplitude image of a time-of-flight sensor, or RGB color images. The disclosed method monitors the state of persons within the field-of-view of the sensor. Within the scope of this invention, state refers to the head pose comprising the heads position in real-world coordinates and the head orientation angles (roll, pitch, jaw); and a number of specific driver states, which are recognized based on the regions that differ from the neutral face.

The disclosed method mentions, for simplicity, the usage of a single depth sensor 24. It should be clear, however, that the same approach could be applied to multiple depth sensors operating in parallel to increase coverage, accuracy or robustness.

Figure 3A:
FIGS. 3A, 3B, 3C, 3D, and 3E illustrate examples of driver distraction and occlusion scenarios.
Figure 3B:
Figure 3C:
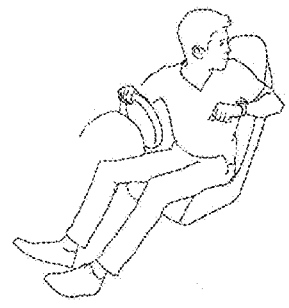
Figure 3D:
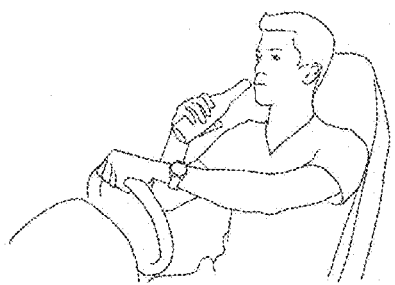
Figure 3E:
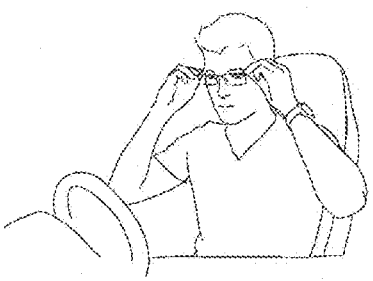

As described more particularly below, the system and method are used to determine various states of the driver and driver head pose using the system of FIG. 1A. While FIG. 1B illustrates the normal driver state, examples of distraction and occlusion scenarios are illustrated in other figures of the drawings. For example, FIG. 3A illustrates a scenario where a driver is possibly asleep. In this image the drivers head is facing down. FIG. 3B illustrates an example of a driver distracted, such as looking upward. FIG. 3C illustrates the drivers attention being diverted, such as by turning his head to one side. FIG. 3D illustrates an example of a driver drinking. FIG. 3 illustrates an example of a driver putting glasses on.

Figure 2:
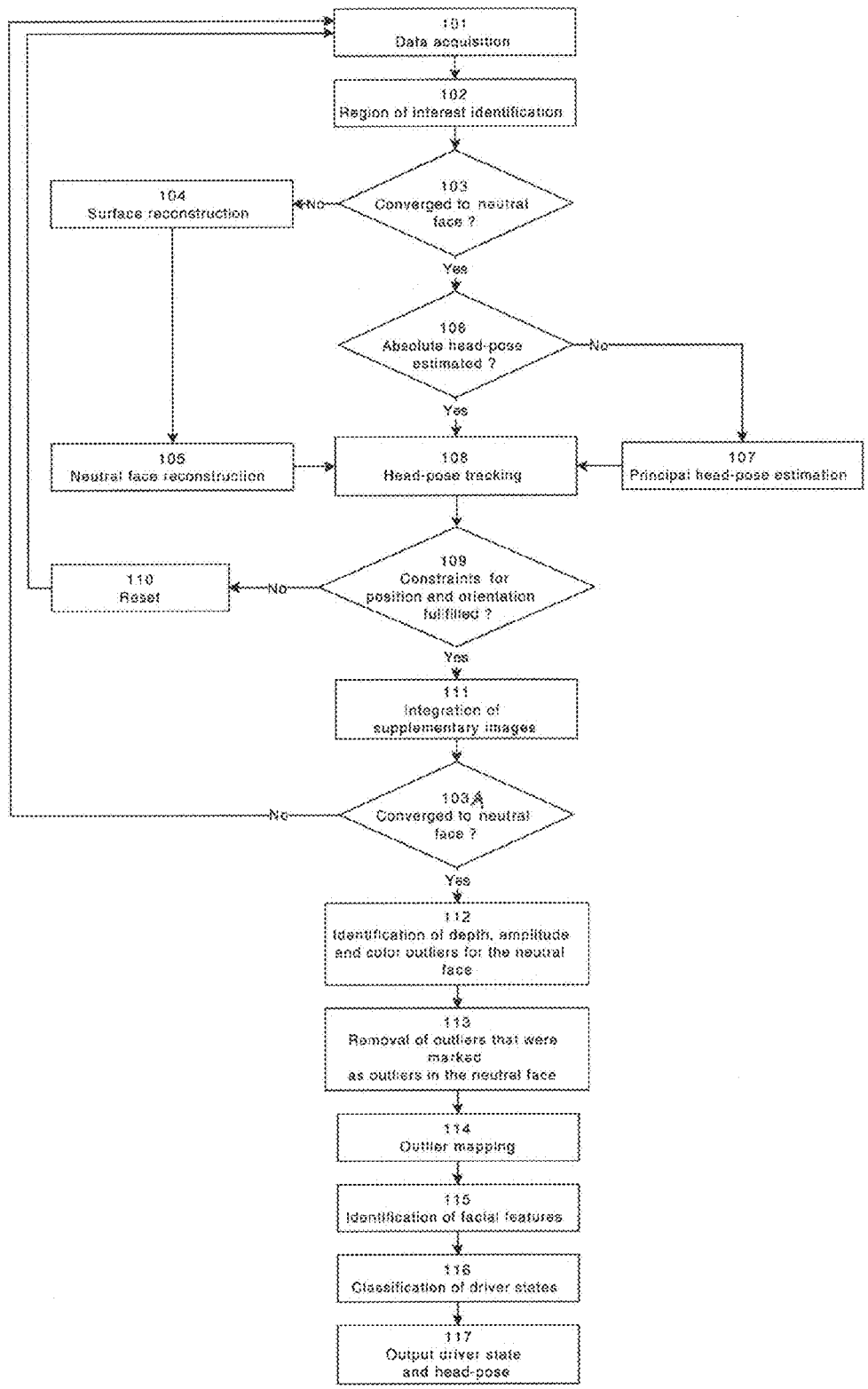
FIG. 2 is a flow chart of a program implemented in the processing unit of FIG. 1A for identifying driver state and head pose.

Referring to FIG. 2, a flow diagram illustrates operation of the program implemented in the processing unit 22 of FIG. 1A for monitoring the status of the driver.

Figure 4A:
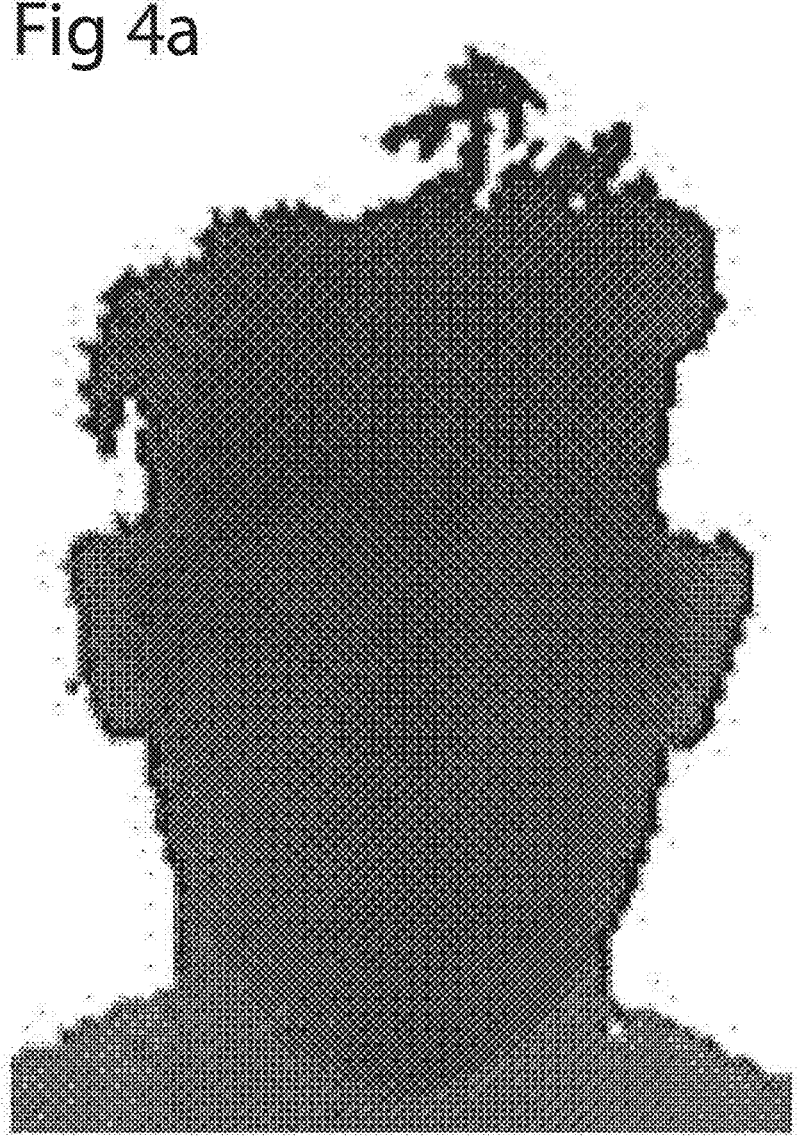
FIGS. 4A, 4B, 4C, 4D, and 4E illustrate image data obtained using the flow diagram of FIG. 2 for obtaining a neutral face model.

The program begins at a data acquisition block 101. This comprises the processing unit 22 acquiring a depth image from the depth sensor 24. Every pixel location (i,j) a three-dimensional vector with the corresponding horizontal, vertical and distance information for the pixel at that location is assumed to be available. In some cases supplementary images (e.g. amplitude, intensity, RGB or other) may be acquired that are properly registered with the depth image, i.e. a pixel in the depth image captures the same 3D point as the corresponding pixel in the secondary image. Some appropriate sensors do deliver such data by default (e.g. time-of-flight sensors); for other sensors there exist methods to register two images (e.g. for structured light sensors such as the Kinect that have a second non-depth image sensor attached, or stereo sensors). FIG. 4A illustrates the depth image obtained from the data acquisition step of the block 101.

Figure 4B:
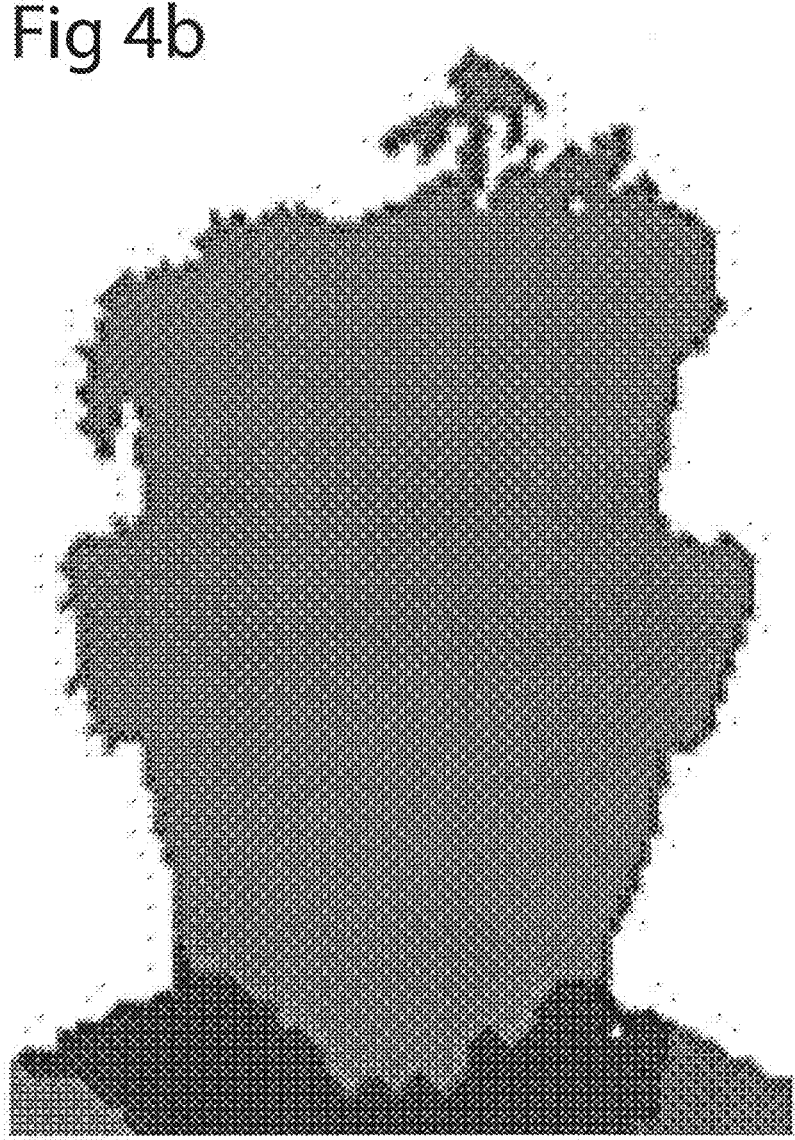

A region of interest, i.e. the set of pixels belonging to the head, is obtained through various means at a block 102. FIG. 4B illustrates the region of interest showing the portion of the depth image identified as the pixels belonging to the head in a lighter shade. In the simplest case, the sensor 24 is physically mounted and constrained with respect to the field of view of the lens such that only the user's head H may be visible. Further, if available, a secondary color image may be used to identify skin pixels. Methods based on random decision forests, as disclosed in U.S. Pat. No. 5,930,392, or the well-known Viola-Jones method (U.S. Pat. No. 7,099,510) may as well be used to identify head pixels. Additionally, a physical model of the environment may be used to exclude pixels within certain regions for any further processing. For example, a static image of the interior of the vehicle may be stored in the memory 28 and this may be used to exclude corresponding data in the image so that what is left is the image of the user.

Thereafter, the program is operable to obtain an average neutral face model. The neutral face can be thought of as a reference image comprising an image of the driver in a normal, non-distracted driving state. In an initial phase, both the neutral phase and the principal head pose are determined. The neutral face is used to later obtain the driver-state features and head poses later continuously updated relative to the principal head post. Both the neutral face and the principal head pose are obtained without the user being aware of this.

Figure 4C:
Figure 4D:
Figure 4E:
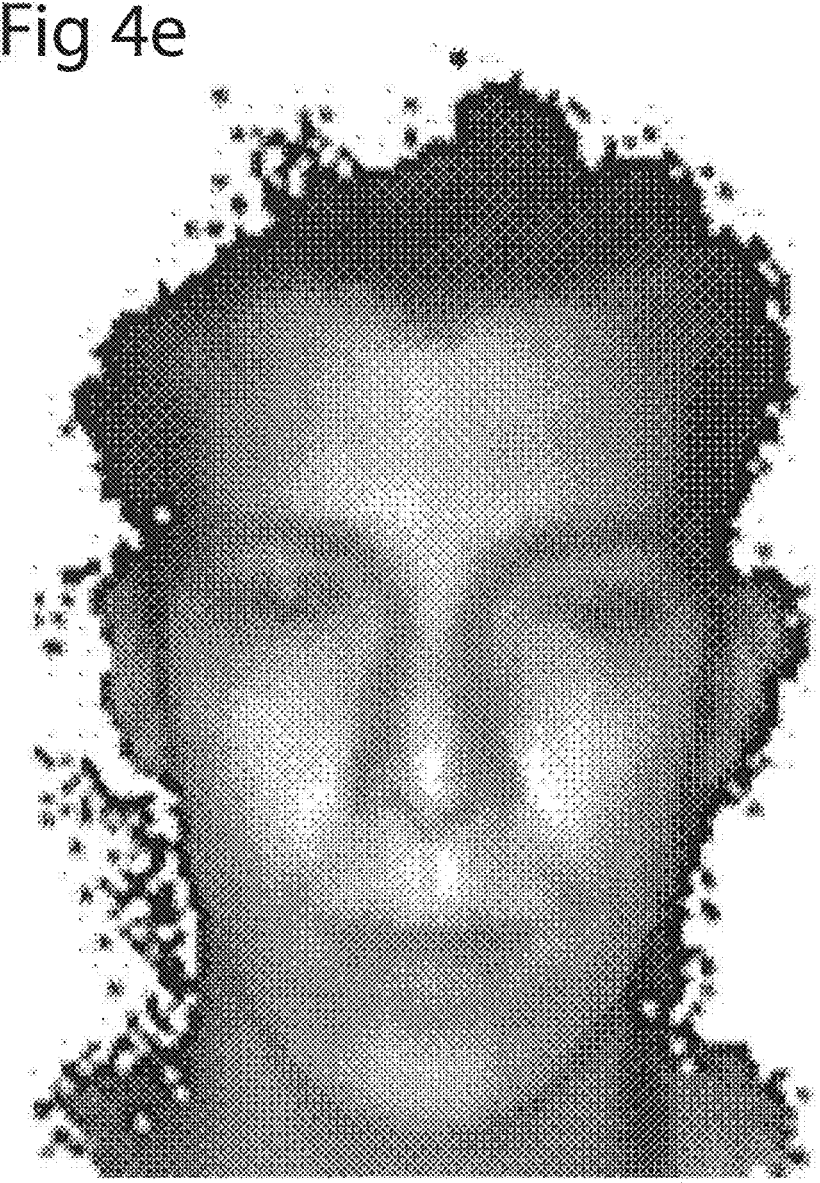

A decision block 103 determines if the program has converged to a neutral face. This is based on whether a stable neutral face has been obtained. If not, then a surface reconstruction step is performed at a block 104. This does not require a motion sensor to be attached to the object, which is to be reconstructed, but relies exclusively on the estimation of relative motion (translation and rotation) of the object with respect to two consecutive frames of the observed image sequence. The surface can be reconstructed by using methods described above, such as those in U.S. Pat. No. 9,251,590, U.S. patent application Ser. No. 13/017,474, or U.S. patent application Ser. No. 13/017,587, or alternative known methods. The neutral face is then reconstructed at the block 105. FIG. 4C illustrates an amplitude image for the neutral face. FIG. 4D illustrates the reconstructed 3D neutral face and FIG. 4E the reconstructed amplitude neutral face resulting from the surface reconstruction and neutral face reconstruction of the blocks 104 and 105.

After the neutral face model is adapted into convergence, as determined at the decision block 103, a decision block 106 determines if an absolute head pose has been estimated. If not, then a principal head pose estimation is made at the block 107. If so, or after the principal head pose estimation at the block 107, a block 108 implements head pose tracking. In the main loop of the program only the head pose is tracked. This estimates the current position of the head relative to the previous position. These relative changes in pose are integrated to obtain the absolute pose at the block 109 but depend on an initial pose, called a principal pose. The principal pose is determined at the block 107 at start. For determining the principal pose, various methods can be used. For example, one of the known methods relying on facial features or landmarks described in the background above may be used. Another method would be to calibrate the system by assuming that the driver will most often look at the road ahead and then track the pose relative to this frontal-view pose.

Position and orientation of the sensor 24 relative to the head H, are represented by a transformation matrix $T_k^g$ containing a rotation matrix $R_k$ and a translation vector $t_k$:

$$T_k^g = \begin{pmatrix} R_k & t_k^T \\ \overline{0} & 1 \end{pmatrix}$$

The rotation and translation parameters can be estimated by using the method described above or an alternative method. Note that such methods obtain the pose by integrating pose changes over time. This is why a principal pose is required.

Whenever the estimated head pose is outside the field of view or changes faster than the physiological constraints, as determined at a decision block 109, the internal head model is reset at a block 110, and a new principal head pose is estimated by starting back at the block 101. Otherwise, at a block 111 secondary image information such as grayscale or color information, is registered to the depth map, i.e., it is linked to the same voxel as the corresponding depth value.

Iterative closest point (ICP) is a known way of registering data. In the context of the present application, a current face is registered with an "integrated face" that is obtained by integrating over previously registered faces. Outliers are differences between the registered faces. Faces may differ because of head pose. Once head pose has been taken out of the equation, then the remaining differences are outliers. The head model, or head pose, is involved in obtaining the neutral phase. In the initial phase, discussed above, in which the neutral face model is obtained, outliers are considered noise outliers and the program estimates a probability for such noise outliers. Later, when the neutral face model is stable, then outliers are considered to be features which may be due, for example, to changes in facial expression. The initially estimated probability of noise outliers is used to decide whether or not there is a feature outlier. This is based on the assumption that the noise is here permanently and non-neutral facial expressions are rather rare events that deviate from the neutral face with a probability that depends on the noise level, i.e., the above discussed noise outliers. This probability varies over the particular face.

Figure 5A:
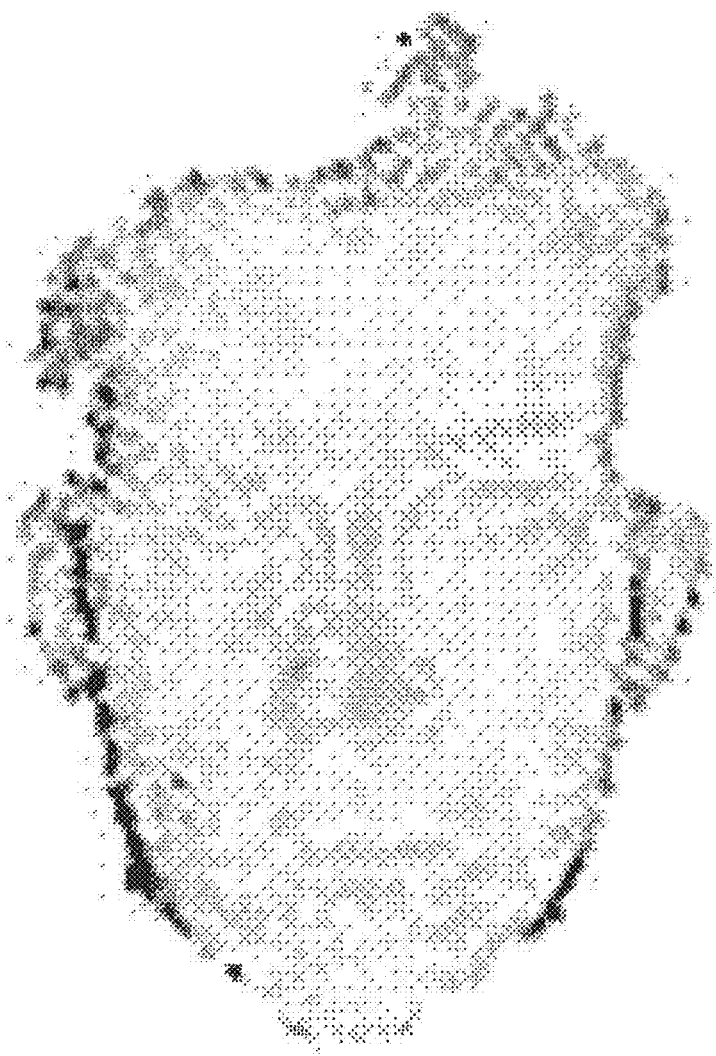
FIGS. 5A, 5B, 5C, 5D, 5E, and 5F illustrate image data at different steps of the flow chart of FIG. 2.
Figure 5B:

A decision block 103A, similar to the decision block 103, determines if the neutral face model remains converged. If an updated neutral face model needs to be determined, then the program loops back to the block 101, discussed above. If not, then identification of depth, amplitude, and color outliers for the neutral face are obtained at a block 112. FIG. 5A illustrates an example of depth outliers. FIG. 5B illustrates an example of amplitude outliers.

Surface outliers of the neutral face are used to later quantify the significance of changes. The reconstructed volume may contain regions with high probability of outliers due to the noise characteristic of the used depth sensing technology (e.g. time-of-flight sensors tend to be inaccurate at depth edges and produce pixels with high variance at these locations). Thus, when measuring deviations from the neutral face the program excludes regions that have a high probability of producing outliers. This is done by integrating the ICP outlier map over time to obtain the probability for each surface patch to produce outliers even for the neutral face.

All current ICP outliers that were marked as ICP outliers for the neutral face are discarded at a block 113 as they lie within regions that have a high variability even for the neutral pose.

Figure 5C:
Figure 5D:
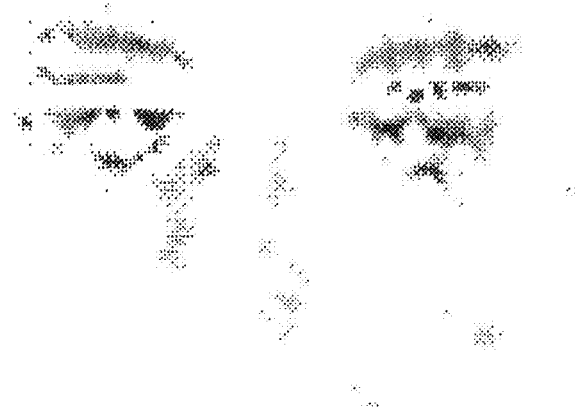
Figure 5E:
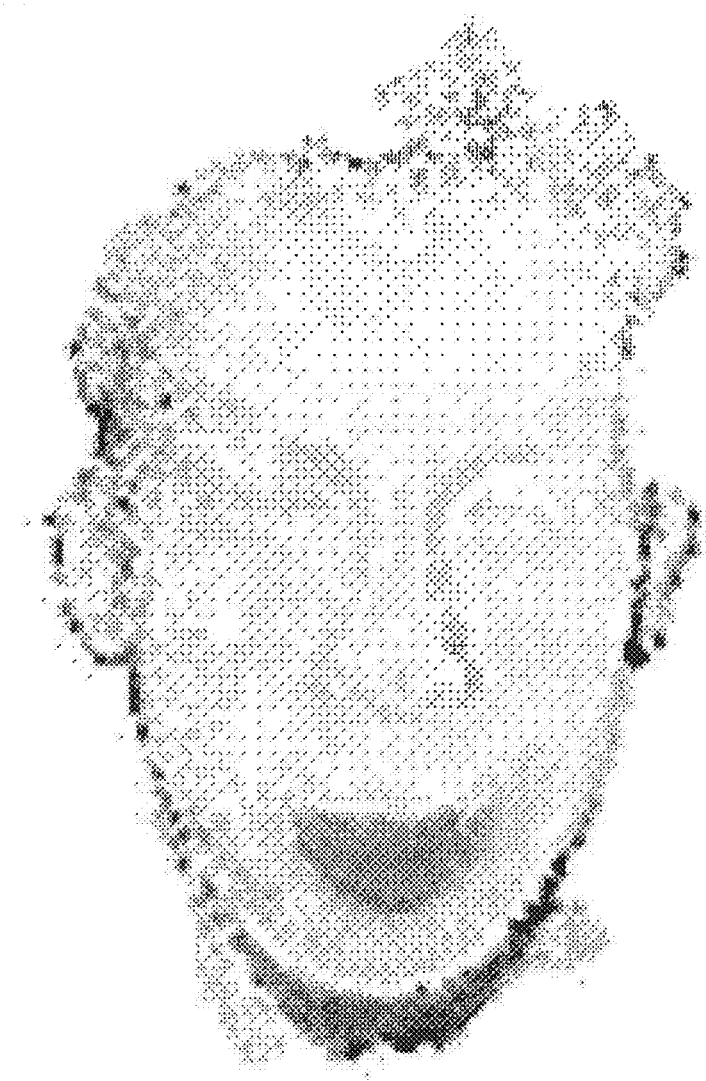
Figure 5F:

Based on the remaining ICP outliers, non-rigid motions and deformations are detected. These are represented by a set of pixel coordinates in the sensor plane, which are not included in the corresponding pairs found in the pose estimation step and have thus been saved in an outlier map. The rationale is that outliers can be caused by either noise and uncertain measurements, or by non-rigid motions and deformations. Noise outliers are mainly noticeable at the edges of depth segments where the surface is nearly orthogonal to the sensor plane's normal vector. FIG. 5C illustrates an example of amplitude outliers with eyes closed. FIG. 5D illustrates the outliers with eyes closed after removal of outliers marked in the neutral face. FIG. 5E illustrates an example of depth outliers with a driver yawning. FIG. 5F illustrates the outliers of the driver yawning after removal of outliers in the neutral face.

Outliers are then mapped onto the head model at a block 114 and marked as either being in front or behind the reconstructed surface.

Robustly identifying the outliers as features is at the core of this invention. Based on these generic features, various known methods can be used to identify semantic facial features at a block 115 and to classify the state of the driver according to predefined categories at a block 116. The categories, i.e. the driver states that are to be detected, depend on the application. Once the states are defined, a database that represents these states is created and machine-learning techniques are used to train a classifier that can then automatically determine the correct state by comparing the determined features to the states defined on the database. Simple adaptive thresholding, Support-Vector-Machines, or deep networks are used as classifiers, depending on the complexity of the application.

Figure 6:
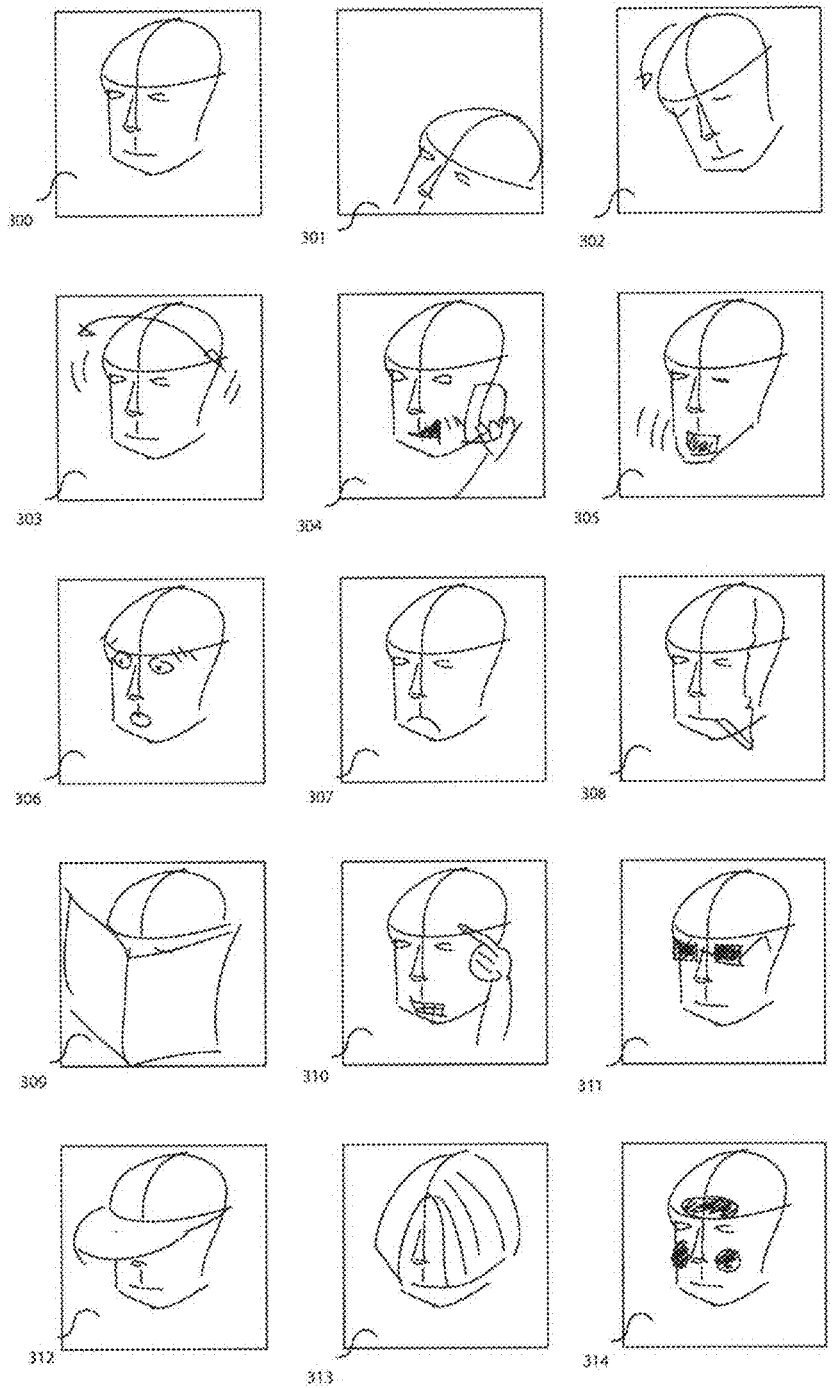
FIG. 6 illustrates various facial expressions, occlusions, and distraction factors.

FIG. 6 shows a number of driver distraction scenarios such as may be included in a database where one or more of the above features allow for classifying the state of the driver.

By tracking the drivers head pose, as discussed above relative to the block 108, the system can quantify deviations from the average neutral face model, illustrated generally as 300 in FIG. 6. These variations include, for example, an inappropriate sitting pose at 301, characteristic nodding patterns due to drowsiness at 302 and patterns of arousal illustrated at 303.

Larger regions that appear closer to the sensor 24 than the neutral face 300 may indicate general distraction such as talking on the phone at 304 or reading a newspaper at 309. Offensive gestures in connection with specific facial expressions as at 310 may also be detected.

Small regions that appear closer to the sensor 24 in the face region may be classified as a driver putting on sunglasses or other wearables at 311 or smoking while driving at 308.

Small regions that appear further away from the sensor 24 relative to the neutral face may indicate that the driver is speaking as at 305. In combination with sudden changes of amplitude or color information at the location of the eyes a shock state at 306 may be detected.

Subtle facial expressions as at 307 require the analysis of the full feature set comprising depth, grayscale and/or color information.

In some cases, significant changes may not directly relate to distraction, but should trigger a reset of the neutral face model, such as in the case of a driver putting on a cap at 312 or particular changes of strands of hair at 313.

Changes in the facial color at 314 may as well contribute to the overall driver state estimate and indicate states such as stress and arousal.

Once the driver state has been classified at the block 116, using, for example, the states shown in FIG. 6, the driver state and head pose are output at a block 117. This output, via the block 26 of FIG. 1A, can then be used by other programs or warning systems or the like for appropriately acting on the state of the driver.

Thus, as described herein, a system and method relate to a computer system that estimates the status of the driver of a vehicle. This does so by classification of spatial and temporal patterns to identify driver status and distraction events.

The present system and method have been described with respect to flow charts and block diagrams. It will be understood that each block of the flow chart and diagrams can be implemented by computer program instructions. These program instructions may be provided to a processor to produce the machine, such that the instructions executed on the processor create means for implementing the functions specified in the blocks. The computer program instructions may be executed by a processor to cause a series of operational steps to be performed by the processor to produce a computer implemented process such that the instructions will execute and the processor provides steps for implementing the functions specified in the blocks. Accordingly, the illustrations support combinations of means for performing a specified function and combinations of steps for performing these specified instructions. It will also be understood that each block and combination of blocks can be implemented by special purpose hardware-based systems which perform the specified functions or steps, or combinations of special purpose hardware and computer instructions. None of the methods according to various aspects disclosed herein is limited to performing the steps thereof in any particular order.

The invention claimed is:

1. A method for real-time driver state monitoring comprising:
    operating an image processing system to receive a sequence of depth images from a depth sensor, each depth image comprising image data representing an image of a scene, wherein said image data comprises a depth value indicating distance from the depth sensor;
    the image processing system identifying a human head in the scene using the sequence of images;
    the image processing system using the depth images to track position and orientation of the human head with respect to a principal position and orientation where the human head is modeled as a 3D surface to define a head model and continuously adapted over time to obtain an average neutral face model where the neutral face is stored in a database including history of changes;
    the image processing system identifying depth deviations from the neutral face; and
    the image processing system classifying such depth deviations as different driver states, where depth variations are compared to the history of changes that has been stored, for a specific driver, in the database and where the comparison is used to extract features for driver-state detection.

2. The method as claimed in claim 1 where supplementary images comprising gray-scale or color images are obtained from the depth sensor or an additional sensor that has been pixel-wise registered to the depth image.

3. The method as claimed in claim 1 where all but head pixels are excluded according to a CAD model of an interior of a car.

4. The method as claimed in claim 1 where the human head is identified by applying a random decision forest.

5. The method as claimed in claim 1 where the human head is identified by skin color.

6. The method as claimed in claim 1 where the human head is identified by a face detection method.

7. The method as claimed in claim 1 where the head model is obtained by an iterative closest point match.

8. A system for real-time driver state monitoring, comprising:
    a depth sensor to capture depth images of a scene and generate image data representing the image of the scene, wherein said image data comprises a depth value indicating distance from the depth sensor; and
    an image processing system operatively connected to said sensor to receive a sequence of depth images from the sensor, the image processing system being programmed to identify a human head in the scene using the sequence of images, using the depth images to track position and orientation of the human head with respect to a principal position and orientation where the human head is modeled as a 3D surface to define a head model and continuously adapted over time to obtain an average neutral face model, identifying depth deviations from the neutral face, and classifying such depth deviations as different driver states, and wherein the image processing system is programmed whereby the neutral face is stored in a database including history of changes and whereby depth variations are compared to the history of changes that has been stored, for a specific driver, in the database and where the comparison is used to extract features for driver-state detection.

9. The system as claimed in claim 8 where the image processing system receives supplementary images comprising gray-scale or color images from the depth sensor or an additional sensor that has been pixel-wise registered to the depth image.

10. The system as claimed in claim 8 where the image processing system is programmed whereby all but head pixels are excluded according to a CAD model of an interior of a car.

11. The system as claimed in claim 8 where the image processing system is programmed whereby the human head is identified by applying a random decision forest.

12. The system as claimed in claim 8 where the image processing system is programmed whereby the human head is identified by skin color.

13. The system as claimed in claim 8 where the image processing system is programmed whereby the human head is identified by a face detection method.

14. The system as claimed in claim 8 where the image processing system is programmed whereby the head model is obtained by an iterative closest point match.

* * * * *